United States Patent [19]

Scholin et al.

[11] Patent Number: 4,775,185

[45] Date of Patent: Oct. 4, 1988

[54] AUTOMOBILE SEAT HAVING ADJUSTABLE THIGH SUPPORT

[75] Inventors: Gilbert H. Scholin, Northfield; Busso Fiorenzo, Ann Arbor, both of Mich.

[73] Assignee: ITT Corporation, New York, N.Y.

[21] Appl. No.: 34,092

[22] Filed: Apr. 2, 1987

[51] Int. Cl.⁴ ............................................. A47C 3/00
[52] U.S. Cl. ..................................... 297/284; 297/312; 297/DIG. 3; 297/DIG. 8
[58] Field of Search ............... 297/312, 284, DIG. 3, 297/DIG. 8

[56] References Cited

U.S. PATENT DOCUMENTS

| | | | |
|---|---|---|---|
| 4,498,702 | 2/1985 | Raftery | 297/312 |
| 4,615,563 | 10/1986 | Kabayashi | 297/284 |
| 4,655,505 | 4/1987 | Kashiwamura | 297/284 |

FOREIGN PATENT DOCUMENTS

| | | | |
|---|---|---|---|
| 2625277 | 12/1977 | Fed. Rep. of Germany | 297/284 |
| 0205238 | 12/1982 | Japan | 297/284 |

Primary Examiner—James T. McCall
Attorney, Agent, or Firm—James B. Raden; Robert P. Seitter

[57] ABSTRACT

An automobile seat having an infinitely adjustable thigh support is disclosed. The seat includes an air operated bladder mounted between a rigid extension on the seat bottom frame and a padded thigh support member pivotably mounted to the seat bottom frame at the thigh location of an occupant of the seat. The thigh support member is positionable at any of an infinite number of intermediate support positions with the thigh support cushion maintained in contact with the seat cushion at all positions of the thigh support.

1 Claim, 3 Drawing Sheets

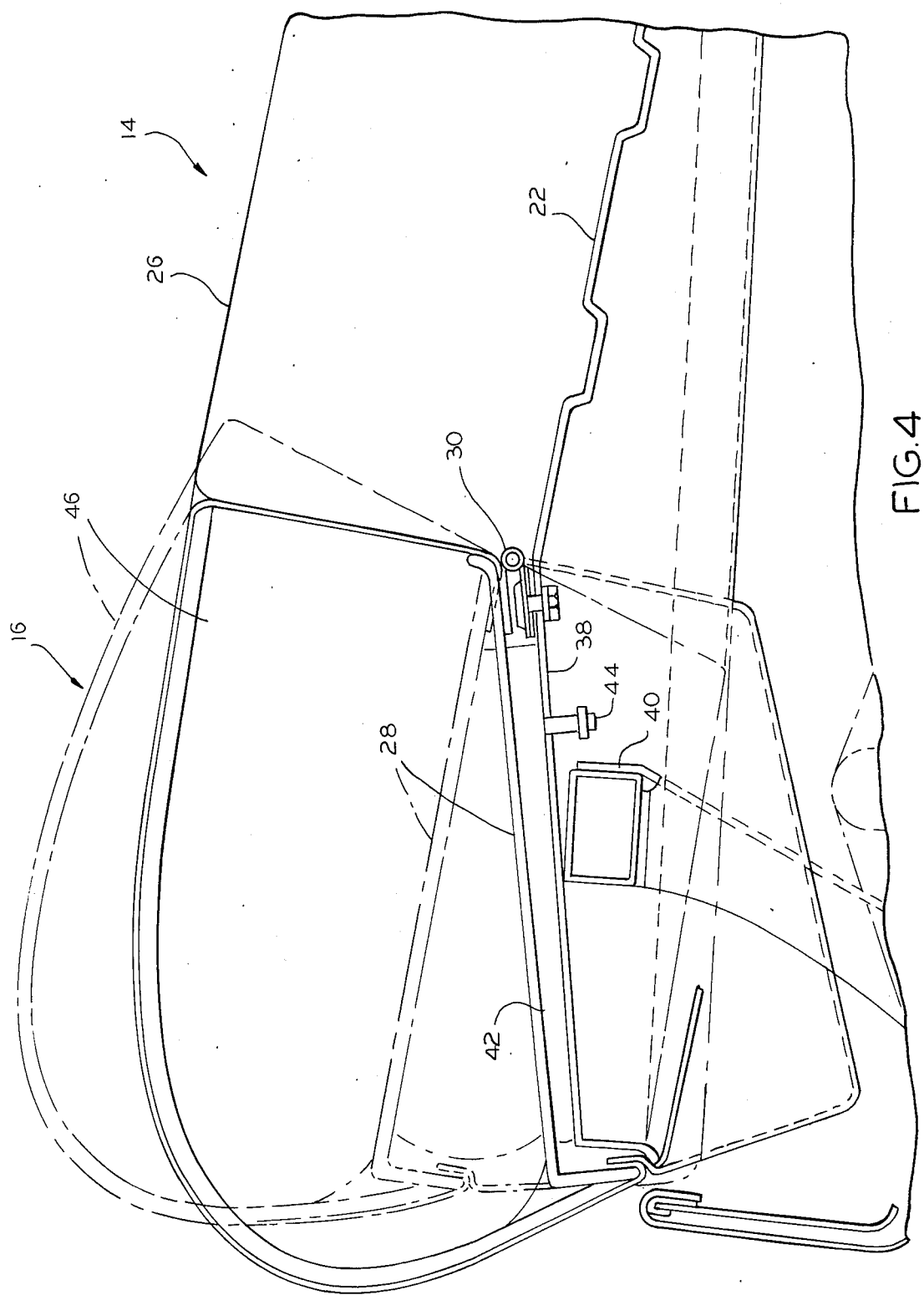

AUTOMOBILE SEAT HAVING ADJUSTABLE THIGH SUPPORT

BACKGROUND OF THE INVENTION

This invention relates to automobile seats. More particularly, the invention relates to an automobile seat having an adjustable thigh support.

In the field of automobile seats it is becoming increasingly popular and advantageous from the standpoint of occupant comfort to provide seats that adjust in contour to accommodate the different body shapes and seating comfort pecularities of different occupants. This is particularly desirable in automobile seating arrangements due to the wide range of different persons that occupy the vehicle seat.

One area of the occupants body for which it is particularly desirable to provide adjustable support is at the persons thigh.

SUMMARY OF THE INVENTION

Accordingly, the present invention is directed to a seat having an adjustable thigh support. According to the invention the lower portion of the seat is provided with a thigh support at its free end which selectively raises and lowers relative to the main seating portion to increase and decrease support of the occupant's thigh.

According to an important feature of the invention, there is provided an upholstered padded thigh support frame pivotally mounted to the lower portion of the seat frame at the thigh location of an occupant. Another feature of the invention provides for expandable-contractable means mounted to the lower portion of the seat frame for causing the thigh support frame to pivot between maximum and minimum support positions.

A still further important feature of the invention provides for an expandable-contractable air operated bladder to operate against the thigh support frame to provide for selective positioning of the thigh support at any of an infinite number of support positions between the maximum and minimum support positions.

According to a still further important feature of the invention, the thigh support frame is a generally plate-like member extending laterally across the entire free end of the lower portion of the seat.

BRIEF DESCRIPTION OF THE DRAWINGS

The invention will be better understood after reading the following Detailed Description of the Preferred Embodiment in conjunction with the drawing in which:

FIG. 4 is an enlarged partial cross sectional view of the thigh support showing another embodiment of the attachment of the thigh support frame to the lower portion of the seat frame.

DETAILED DESCRIPTION OF THE PREFERRED EMBODIMENT

Figure 1:
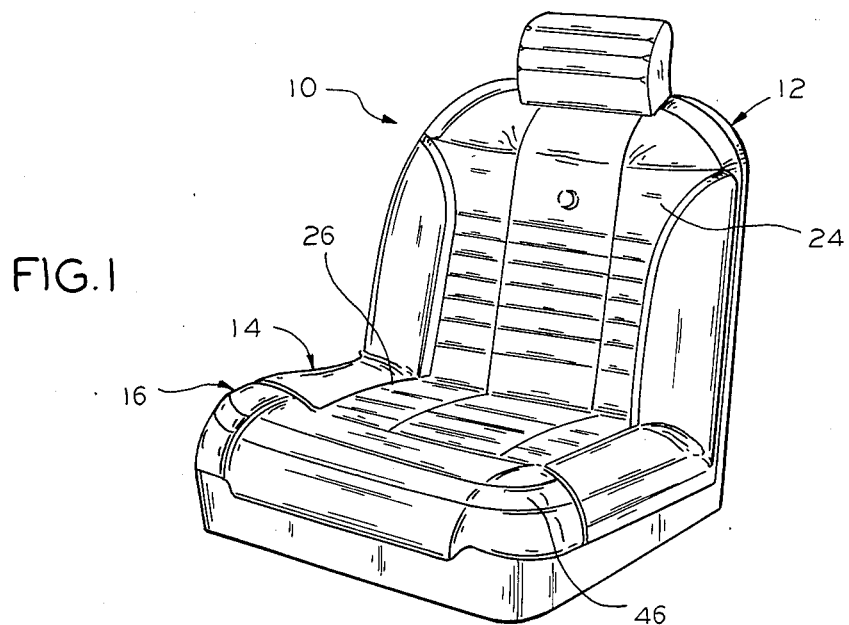
FIG. 1 is a pictorial view of a vehicle front seat including an adjustable thigh support according to the invention.
Figure 3:
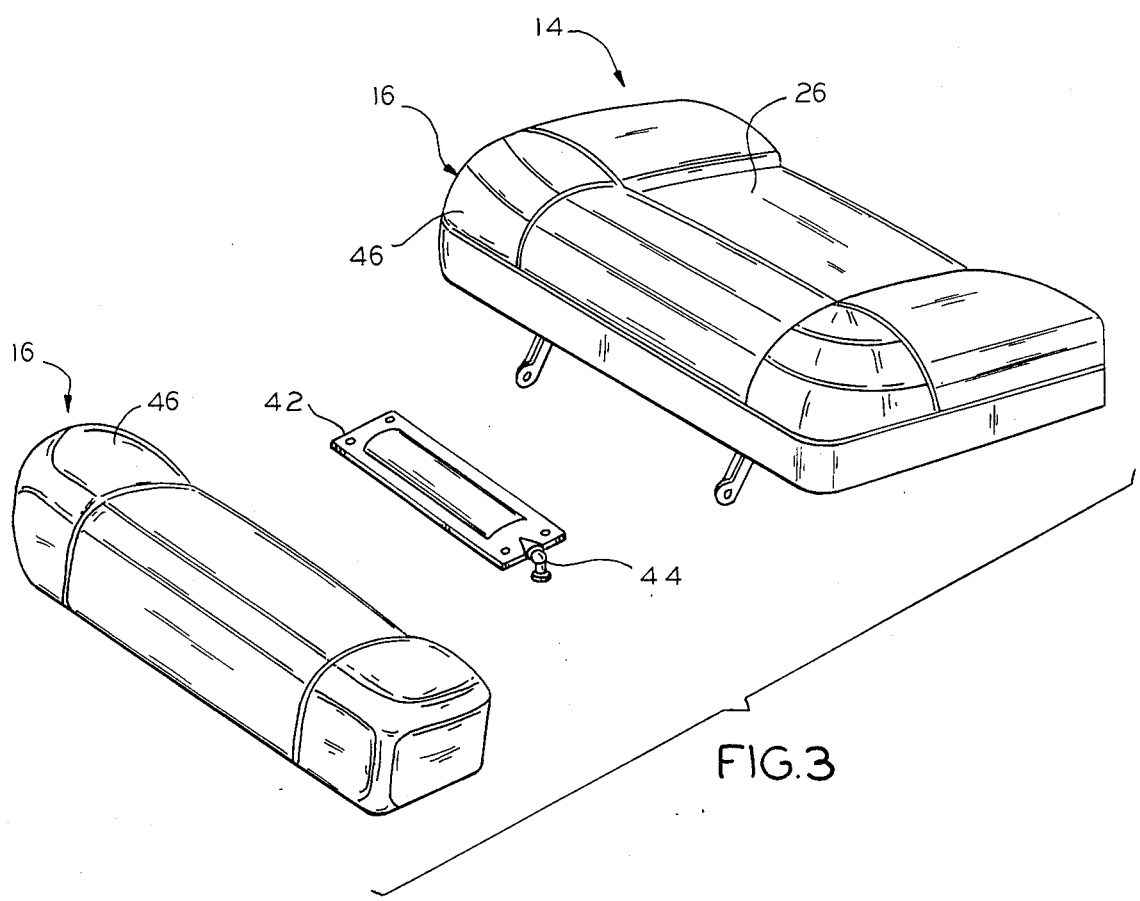
FIG. 3 is an exploded view of the seat bottom of the seat of FIG. 1 showing the relationship of the seat bottom components.

Shown in FIG. 1 is a front seat 10 for use in an automobile seating arrangement. The particular seat configuration shown is representative only and it is to be understood that the invention can be used with other arrangements including, for example, bench type seats wherein the thigh support described is incorporated into each seat occupants position, as well as bucket type seats and split bench type seats.

The seat 10 includes a back portion 12, a lower seat portion 14 and an adjustable thigh support portion 16 at the free end of the lower seat portion 14. The seat includes a frame, only a portion of which is shown generally as 18 in FIG. 2, and wherein only a portion of a seat back frame portion 20 is shown connected to a lower seat frame portion 22. The seat back frame 20 and lower seat frame 22 are covered with padded upholstered cushions 24, 26 in the design appropriate to the vehicle interior.

The thigh support frame 16 includes a plate-like member 28 pivotally attached to the free end of the lower seat frame 22, such as with a continuous hinge 30 shown in FIG. 4. The plate-like thigh support member 28 extends laterally, and preferably across the entire free end of the lower seat frame 22. Other pivotal attachments are possible including a pair or plurality of spaced apart hinges or, for example, the structure according to FIG. 2. That pivotal attachment includes a pair of pins 32, only one of which is shown, at opposite sides of the lower seat frame received in a pair of grooves or holes 34 in projections 36 on the thigh support plate 28. This structure is particularly advantageous from an assembly standpoint in that the separate hinge part is eliminated and the pins 32 only need to be aligned with the grooves or holes 34.

Figure 2:
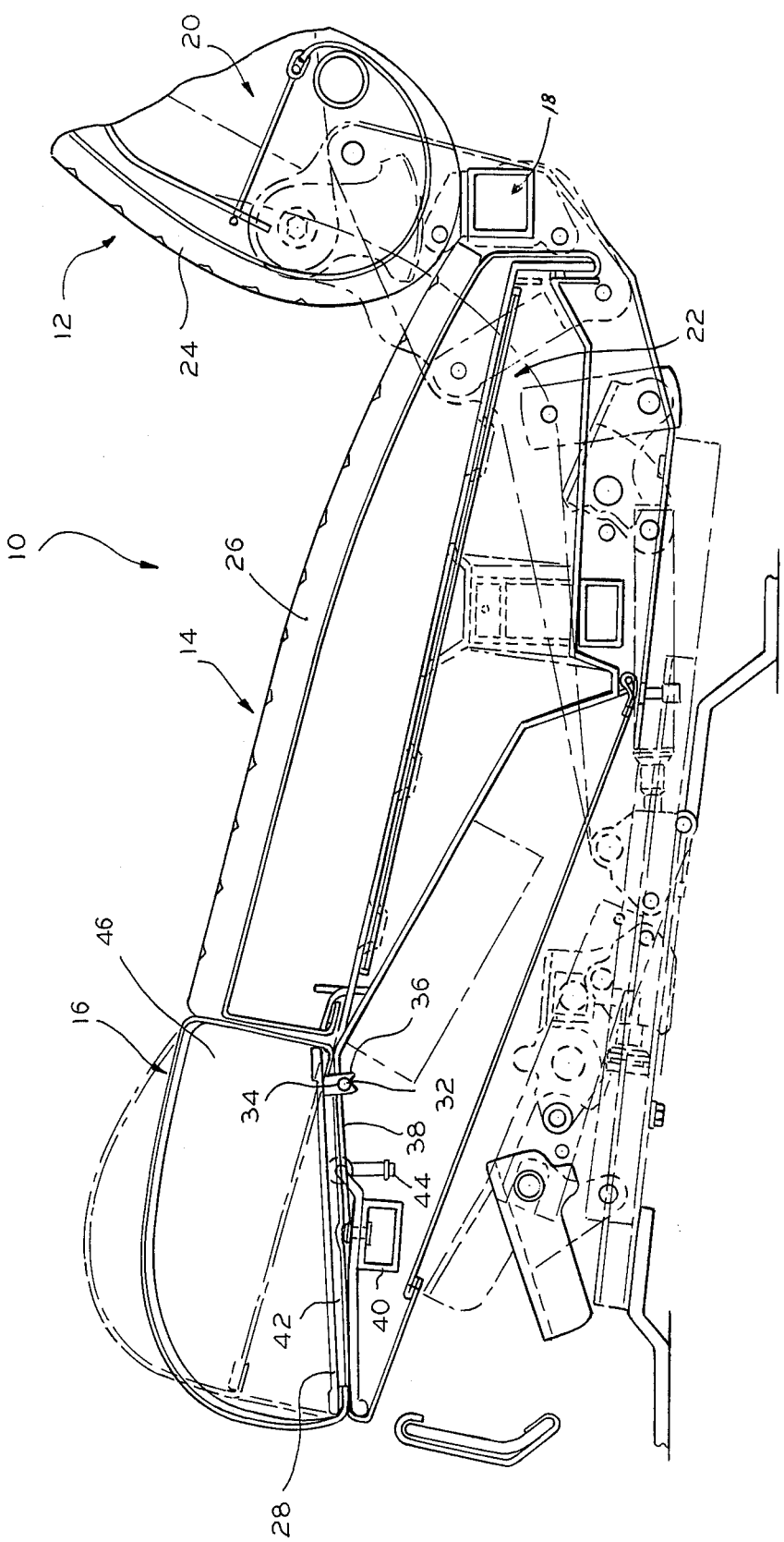
FIG. 2 is a partial vertical cross section of the vehicle seat according to FIG. 1 showing details of construction and operation of the adjustable thigh support.

The forward portion of the seat frame 22, the left end as viewed in FIGS. 2 and 4, is also configured as a flat, rigid plate-like extension 38 and is preferably supported vertically by a transverse member 40 providing a strong platform at the thigh location of an occupant of the seat. Attached to the top of the platform extension 38 beneath the pivotable thigh support plate 28 is an expandable-contractable air operated bladder assembly 42. The bladder assembly receives and exhausts air through the connection 44 which is connected to an appropriate air supply by way of tubing and operator activated controls, not shown. The top surface of the thigh support plate 28 is provided with an upholstered padded cover 46 which abuts against the forward end of the seat bottom cushion 26.

In operation, when additional support is desired, the occupant activates appropriate controls to cause air to enter the bladder causing it to expand against and pivot the thigh support plate 28 up as shown in outline in FIGS. 2 and 4. When the desired position is attained, the inflated bladder holds the thigh support plate in position. If decreased support is desired, the occupant operates the controls to exhaust all or a portion of the air from the bladder whereupon it collapses. The weight of the support plate 28 and the occupants thigh act to move the support plate 28 downward.

As shown in FIGS. 2 and 4, the thigh support is positionable at any of an infinite number of support positions between a fully retracted, minimum support position and a fully extended, maximum support position, as shown in outline form in FIGS. 2 and 4.

A particularly advantageous feature of the structure is that the thigh support cushion 46 remains in abutment against the end of the seat bottom cushion 26 in all positions of the support, thereby eliminating any gap between the two cushions which can otherwise pinch the occupant or provide an open crevice into which objects can fall. Further, the continually abutting cushions provide for an aesthetically pleasing uninterrupted seat bottom.

Having described the preferred embodiment of the invention, others having the benefit of the description can readily device other embodiments and modifications which are to be considered to be within the scope of the appended claims.

What is claimed is:

1. An automobile seat comprising:

a seat frame including a back portion and a seat portion extending from said back portion;

adjustable thigh support means at the free end of said seat portion of said seat frame, said adjustable thigh support means comprising a rigid plate-like portion extending from the free end of said seat portion and supported intermediate its ends by a transverse member, and a support member pivotably mounted to said plate-like portion adjacent the free end of said seat portion of said seat frame for movement between a minimum support position and a maximum support position; expandable-contractable air operated bladder means mounted on said rigid plate-like portion with an expandable-contractable portion thereof engaging said support member for selectively moving said support member to any of an infinite number of intermediate support positions between said minimum and maximum support positions; and said back and seat portions including an upholstered padded back and seat cushion, respectively, and wherein said support plate includes a separate upholstered padded thigh support cushion, the adjacent upper edges of said seat and thigh cushions being in constant contact in all positions of said support member.

* * * * *